US012649821B2

(12) United States Patent
Iyer

(10) Patent No.: US 12,649,821 B2
(45) Date of Patent: Jun. 9, 2026

(54) POLYESTER, POLYESTERAMIDE, AND POLYAMIDE COMPOSITIONS

(71) Applicant: Ananthanarayanan V Iyer, Moraga, CA (US)

(72) Inventor: Ananthanarayanan V Iyer, Moraga, CA (US)

( * ) Notice: Subject to any disclaimer, the term of this patent is extended or adjusted under 35 U.S.C. 154(b) by 849 days.

(21) Appl. No.: 17/577,966

(22) Filed: Jan. 18, 2022

(65) Prior Publication Data

US 2022/0325035 A1 Oct. 13, 2022

Related U.S. Application Data

(60) Provisional application No. 63/114,763, filed on Nov. 17, 2020.

(51) Int. Cl.

| | |
|---|---|
| ***C08G 63/16*** | (2006.01) |
| ***C08G 63/199*** | (2006.01) |
| ***C08G 63/685*** | (2006.01) |
| ***C08G 63/84*** | (2006.01) |
| ***C08G 69/26*** | (2006.01) |
| ***C08G 69/44*** | (2006.01) |

(52) U.S. Cl.

CPC ........... *C08G 63/16* (2013.01); *C08G 63/199* (2013.01); *C08G 63/6856* (2013.01); *C08G 63/84* (2013.01); *C08G 69/26* (2013.01); *C08G 69/44* (2013.01)

(58) Field of Classification Search

None

See application file for complete search history.

(56) References Cited

U.S. PATENT DOCUMENTS 11,345,779 B2 5/2022 Bastioli et al.

FOREIGN PATENT DOCUMENTS

EP 0356963 A2 * 7/1990
WO WO-2018186744 A1 * 10/2018 ............. C08G 63/78

OTHER PUBLICATIONS

Shibata & Takasu, Synthesis of polyester having pendent hydroxyl groups via regioselective dehydration polycondensations of dicarboxylic acids and diols by low temperature polycondensation, Journal of Polymer Science Part A: Polymer Chemistry, 2009, 47, 5747-5759 (Year: 2009).*

(Continued)

*Primary Examiner* — Randy P Gulakowski
*Assistant Examiner* — Audra J Destefano
(74) *Attorney, Agent, or Firm* — Plager Schack LLP; Mark H. Plager; Kara K. Verryt

(57) ABSTRACT

Linear, comb, and star shaped non-ionic polyesters and copolyesters, polyesteramides, polyamides, and copolyamides may be synthesized from the condensation polymerization of polyacids containing alpha-hydroxy polyacids and diols and/or polyols, and amino-diols and/or amines using boric acid, boric anhydride, and boronic acids as catalysts. Depending on the polyol, polyamine, and amino alcohol component, the resulting compound may be hydrophilic or hydrophobic, but not water soluble or dispersible, enabling use in packaging films, fibers, and other molded articles. The compounds may be completely water soluble, water dispersible, and/or amphipathic, thus being useful in cosmetics, agricultural compositions, biomedical and pharmaceutical applications.

13 Claims, 5 Drawing Sheets

(56) References Cited

OTHER PUBLICATIONS

Mesiano, Biocatalytic synthesis of fluorinated polyesters, Biotechnology Progress, 2000, 16, 64-68 (Year: 2000).*
Odian, Principles of Polymerization, Fourth Edition, Ch. 2, pp. 39-197, 2004.
Choi et al, Chapter 7: Step-Growth Polymerization, Polymer Reaction Engineering, pp. 273-334, 2007.
Williams, What is a dn/dc value and why is it important for GPC/SEC?, pp. 1-7, Aug. 22, 2018.
Kasmi et al., Synthesis and characterization of fully biobased polyesters with tunable branched architectures, Polymer Chemistry, 12, pp. 991-1001, 2021.
ASTM Committee, Standard Test Method for Transition Temperatures and Enthalpies of Fusion and Crystallization of Polymers by Differential Scanning Calorimetry, pp. 1-8, 2025.
Zeng et al., Functionalized polyesters derived from glycerol: Selective polycondensation methods toward glycerol-based polyesters by different catalysts, Journal of Applied Polymer Science, pp. 1-7, 2019.
Ensing, On the origin of the extremely different solubilities of polyethers in water, Nature Communications, pp. 1-8, 2019.
Israelachvili, The different faces of poly(ethylene glycol), Proc. Natl. Acad. Sci. USA, 94, pp. 8378-8379, Aug. 1997.

* cited by examiner

POLYESTER, POLYESTERAMIDE, AND POLYAMIDE COMPOSITIONS

RELATED APPLICATION

This application claims priority to provisional U.S. patent application Ser. No. 63/114,763 filed on Nov. 17, 2020, the entire contents of which is herein incorporated by reference.

BACKGROUND

The embodiments described herein relate generally to chemical compounds and, more particularly, to novel linear, comb, and star shaped non-ionic, anionic, cationic, mixed charge, or zwitterionic polycondensation polymers, such as polyesters and co-polyesters, polyesteramides, polyamides, and copolyamides formed by the condensation polymerization of polyacids containing alpha hydroxyl polyacids and diols and/or polyols, and diamines and/or polyamines, and amino-diols using boron based catalysts, boric acid and boronic acids.

A major focus area in chemical and pharmaceutical research currently deals with the development of new sustainable polymeric materials as replacements for petroleum-based polymers. These new polymers are built using renewable raw materials as building blocks, applying non-toxic processes and energy efficient methods of converting them into products of societal value, and finally disposing the used product in an environmentally benign manner. In terms of access to renewable raw materials, sugar-based compounds are actively sought because of their abundant availability from agricultural and forest resources as well as competitive pricing vis-à-vis petroleum derived counterparts.

Sugar acids, especially alpha-hydroxy acids, such as glycolic acid, lactic acid, tartaric acid, malic acid, and mandelic acid, have been pursued as polymerizable building blocks for synthesizing polyester and co-polyesters. It is possible to form simple oligomeric esters from alpha hydroxyl acids into low molecular weight gels, but higher molecular weights are not accessible. Moreover, the existing compounds are hydrophobic and at the best amphiphilic, meaning that none have sufficient polar functionality to render them water soluble.

Higher molecular weight polyesters from alpha hydroxyl acids, such as lactic acid and glycolic acid, and their copolymers are commercially available. However, these polymers are hydrophobic and require copolymerization with water soluble oligomeric or polymeric building blocks to render them hydrophilic.

The preparation of polyester and copolyesters is well known, and such reactions typically occur at a temperature of from 150° C. to 300° C. in the presence of commercial polycondensation catalysts, such as titanium isopropoxide, manganese diacetate, antimony oxide, dibutyl tin diacetate, zinc chloride, zinc octoate, or combinations thereof. However, generally, the direct synthesis of water soluble and water dispersible polyesters from hydroxyl containing diacids or diols is difficult because the aforementioned catalysts do not discriminate between the hydroxyl groups on the diacid and the added diols resulting in gels. One approach to overcome this challenge is to protect the hydroxyl groups of the aldaric acids (diacids with pendant hydroxyl groups) to enable esterification with added diols using a general polyester catalyst. However, these approaches lead to the undesirable degradation of the polymer main chain, resulting in low molecular weight polymers, which in turn result in low glass transition temperature. Another approach includes first building an unsaturated polyester using fumaric acid and 1,4-butanediol followed by dihydroxylation of the fumaric acid unsaturation to give water soluble poly(butylene tartrate)s; however, this approach results in the production of amorphous polyester without control on chirality of the introduced hydroxyl groups. Yet another approach to make water-soluble polyesters is to discriminate the hydroxyl groups of the added diol for reaction with the diacid. While this results in linear polyesters, there is limited regioselectivity, resulting in a mixture of 1,3- and 1,2-glycerol esters in the polymer chain, while higher alkyl chain acid chlorides resulted in crosslinking and gelling.

To manufacture pendant functional polyesters, regioselective esterification has been reported with enzymes, such as lipases. However, high selectivity between the monomer substrates and the enzyme catalysts are required, which limits the number of monomers that can be catalyzed to prepare high-molecular-weight polyesters with desirable functionality. In another approach, researchers have used rare-earth triflates as catalysts for producing pendant hydroxyl containing polyesters. These processes require the use of hazardous solvents and do not discriminate between the type of carboxylic acid, viz., alpha versus beta or gamma-hydroxy carboxylic acids. While the process discriminates reactivity between the primary and secondary hydroxyl groups on the diol versus the hydroxyl acid, respectively, this also limits the polycondensation process to only primary polyols. In practice, the resulting polyesters are restricted to low molecular weight analogues because higher temperatures required for transesterification was not accessible.

Polycondensation reactions also yield other polymers of value such as polyamides and polyesteramides. Direct high temperature polycondensation of aliphatic carboxylic acids with aliphatic amines is used to manufacture polyamides, such as nylon 6,6. However, melt polycondensation of a polyhydroxy diacids with diamines results in crosslinked gels.

Polydepsipeptides, which are linear polyester amides containing alpha-hydroxy acid and alpha-amino acids, are prepared by the ring opening polymerization of substituted cyclic monomer, morpholine-2,5-dione, using stannous octoate and enzyme lipase as ring opening catalysts. These catalysts suggest that the ring opening of the lactam-lactone molecule is initiated at the lactone moiety of the cyclic monomer. No solvents or media are required for the polymerization process. By varying the alpha amino acid substituent different polyesteramides have been built specifically of promising value to the pharmaceutical and biomedical industry as a biologics or drug delivery vehicle. The building of the of substituted morpholine-2,5-dione is normally a multistep process and quite rigorous utilizing hazardous solvents and media.

It is widely recognized that sugar acids, especially aldaric acid and their derivatives are excellent raw materials for preparing polyhydroxylated nylons. Tartaric acid, which is considered as one of the simplest aldaric acid analogues, is obtained as a by-product of the wine industry, and has been explored for building high molecular weight, hydrophilic, stereoregular poly(tartaramide)s with the hydroxyl groups protected. These tartaramides are optically active and reportedly not sufficiently bioresorbable or biodegradable for widespread use in biomedical fields or consumer applications.

Dimethyl L-tartrate has been shown to form reasonably high molecular weight polyhydroxylated nylon with hexamethylenediamine in solvent media, such as hexamethylenephosphoramide at room temperature. But the need for hazardous and high boiling solvents makes the process environmentally and economically unsustainable.

Unprotected and esterified D-glucaric acid, as well as its lactones, have been used to make polyhydroxylated polyamides in solvent media. Triethylamine was reportedly utilized as a base to enhance the conversion of the methyl ester to the lactone during the solution condensation polymerization to incorporate as much of the monomer into the polyamide as possible. The polyhydroxylated nylon thus produced were reported to have reasonably high melting temperature, although the gel permeation chromatography molecular weights are low. The challenge with these approaches is the use of hazardous reagents and the effort required to clean-up the crude to achieve the final product, which makes the process of manufacture either uneconomical or unsustainable.

Poly(ester amide)s combine the outstanding thermal and mechanical properties of polyamides with the biocompatibility and biodegradability of polyesters. They are generally manufactured by the ring opening copolymerization of lactones and lactams, or by polycondensation reaction between a diacid, diol and amino acid, or a mix of the two processes. Both, linear and star-shaped polyester amides are reported in literature.

The preparation of core-type star polyesteramide is reported extensively in literature and involves the ring opening reaction of lactones (cyclic esters) using a polyol initiator in the presence of an organometallic catalyst containing tin and aluminum.

Therefore, what is needed is biobased and sustainable polymeric materials solutions to support society's existing needs and future requirements. More specifically, what is needed is polycondensation polymers, specifically polyhydroxylated polyesters, polyhydroxylated polyamides, and polyhydroxylated polyesteramides built using alpha-hydroxy acids and certain beta hydroxyl acids, wherein the stereochemistry of the hydroxyl groups building block alpha hydroxyl acids and beta hydroxyl acids is maintained to an extent greater than 99% in the repeat units of the synthesized condensation polymer.

SUMMARY

Some embodiments of the present disclosure include linear, comb, and star shaped non-ionic polyesters and copolyesters, polyesteramides, polyamides, and copolyamides, which may be synthesized from the condensation polymerization of polyacids containing alpha-hydroxy polyacids and diols and/or polyols, and amino-diols and/or amines using boric acid, boric anhydride, and boronic acids as catalysts. The compounds may be completely water soluble, water-dispersible, and/or water gellable, thus being useful in cosmetics, good, agricultural compositions, pharmaceutical and biopharmaceutical compositions, biomedical and drug delivery devices. Depending on the polyol, polyamine, and amino-diol component, the resulting compound may be hydrophilic or hydrophobic, but not water soluble or water-dispersible, enabling use in packaging films, fibers, and other molded articles

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
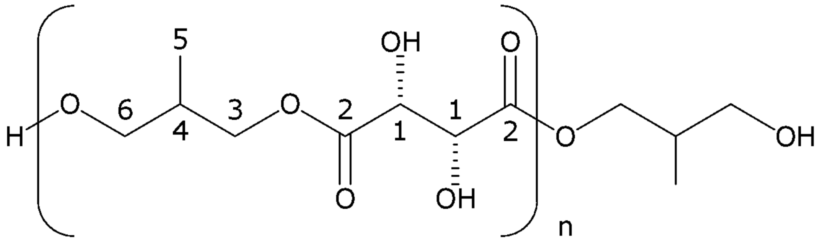
FIG. 1 is a structural formula of one embodiment of a polyester of the present disclosure.
Figure 2:
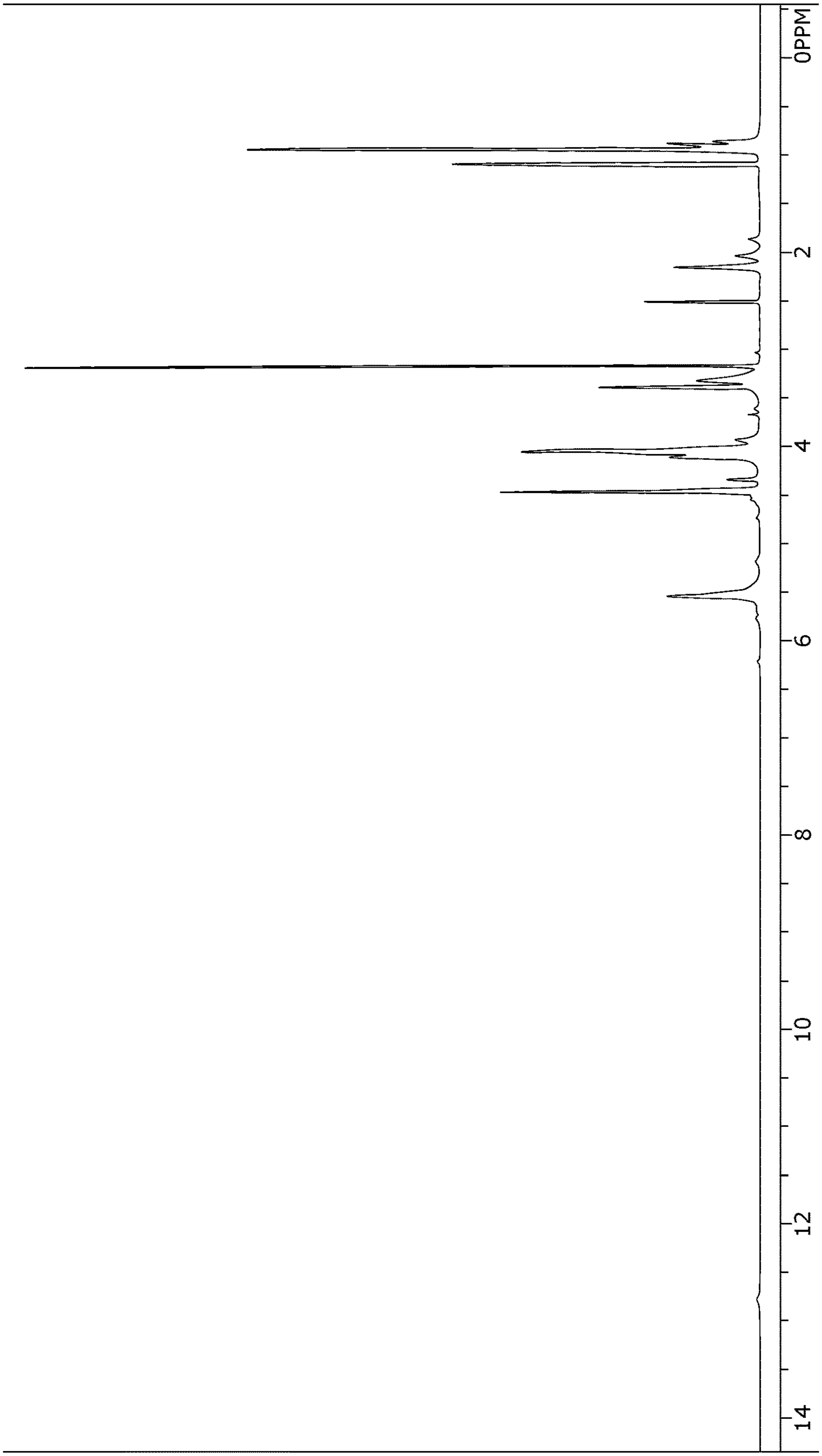
FIG. 2 is a graphical representation showing results from a 1H nuclear magnetic resonance (NMR) spectrum for an exemplary compound of the present disclosure.
Figure 3:
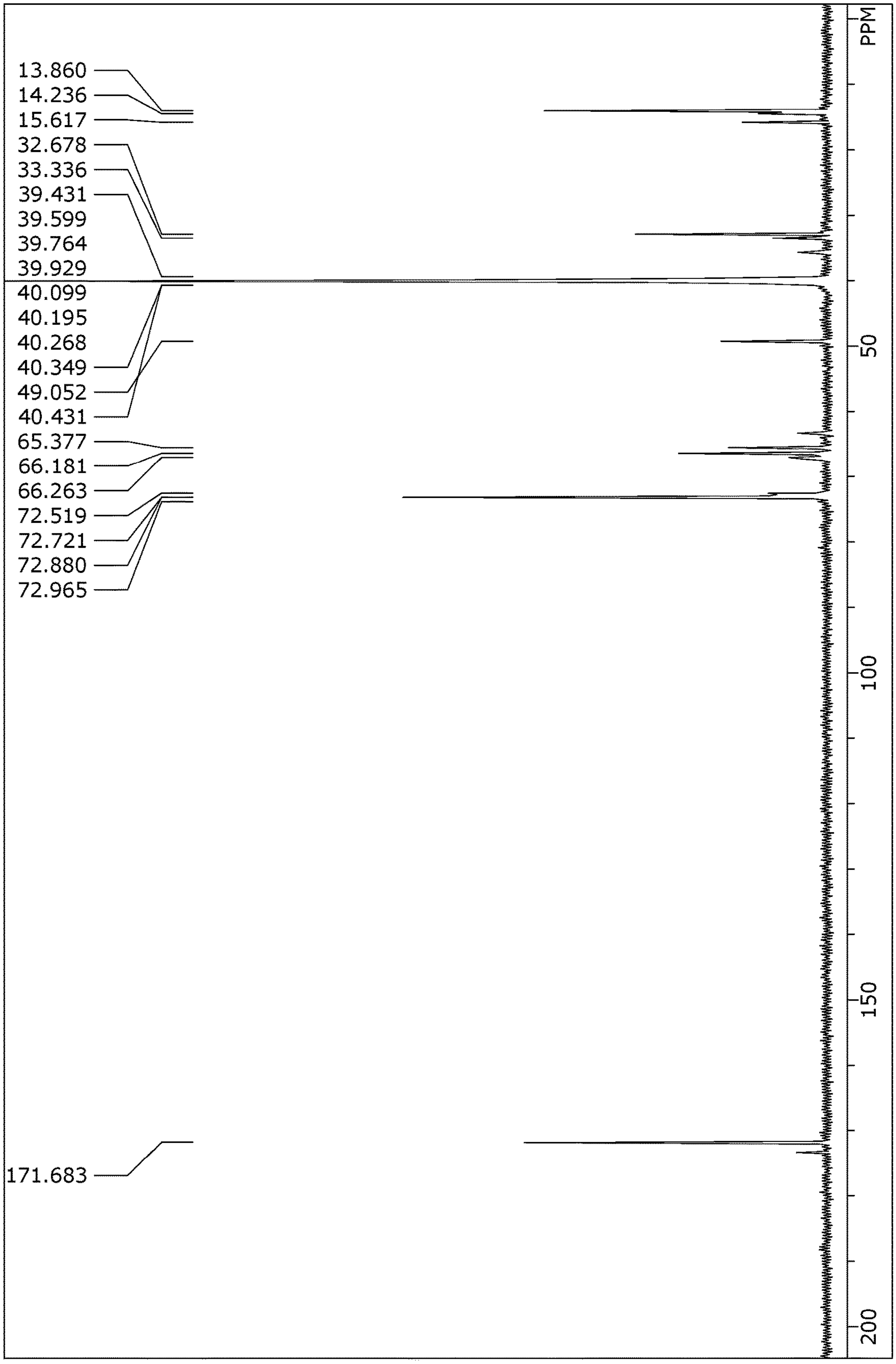
FIG. 3 is a graphical representation showing results from a 13C NMR spectrum for an exemplary compound of the present disclosure.
Figure 4:
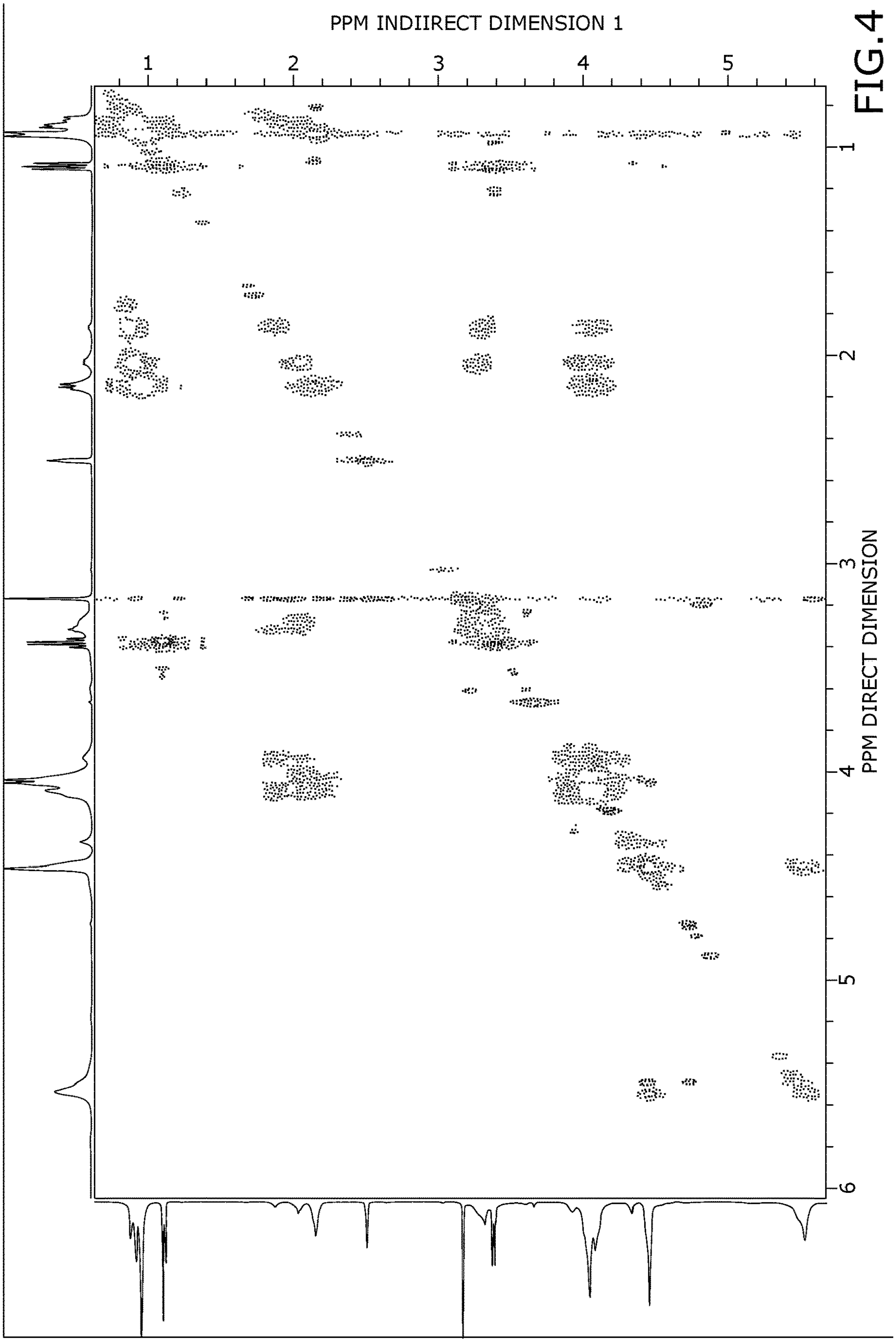
FIG. 4 is a graphical representation showing results from a correlated spectroscopy (COSY) NMR spectrum for an exemplary compound of the present disclosure.
Figure 5:
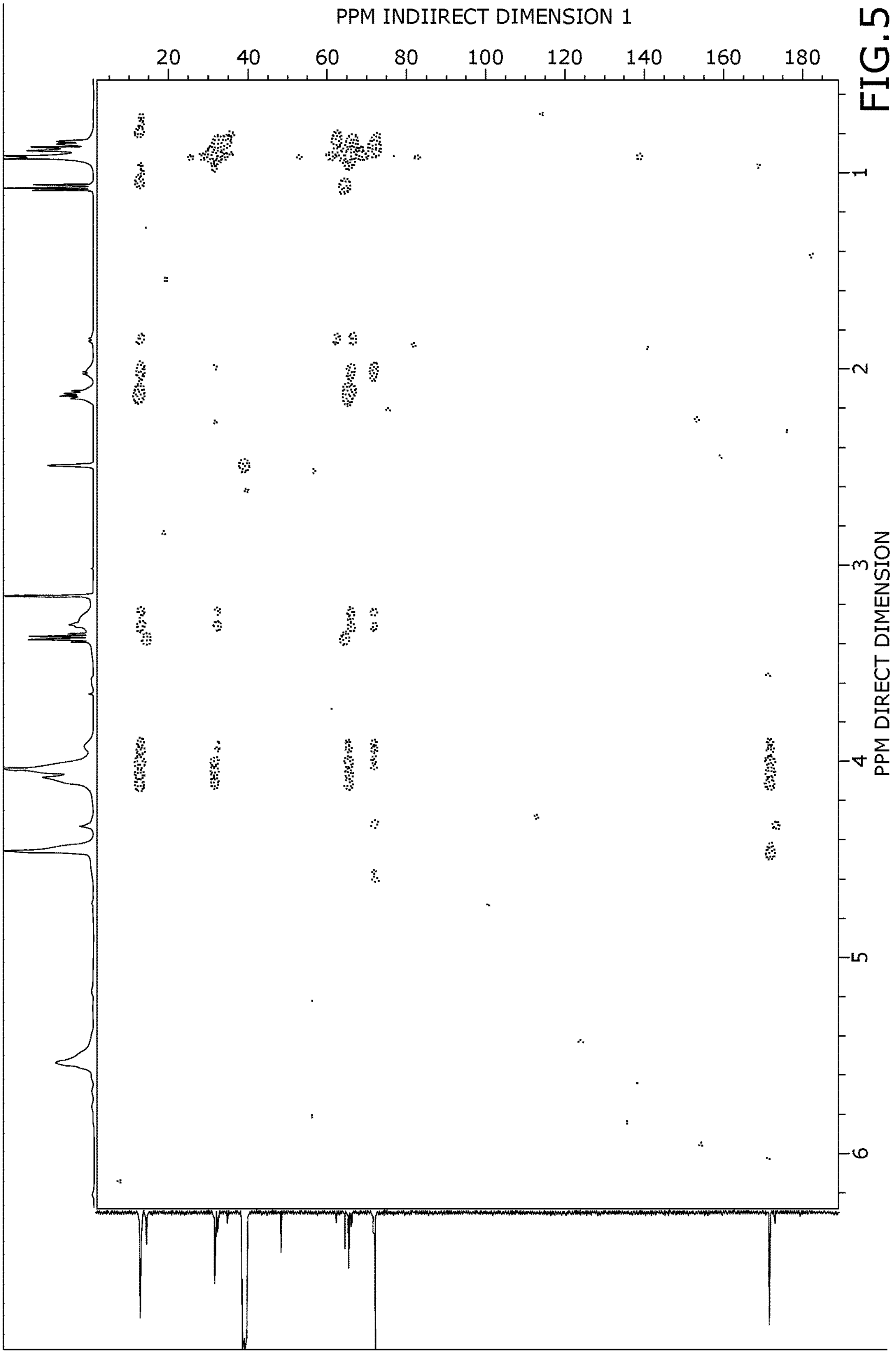
FIG. 5 is a graphical representation showing results from a heteronuclear multiple bond spectroscopy (HMBC) NMR spectrum for an exemplary compound of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The composition of the present disclosure may be a polyester, polyesteramide, or polyamide composition for various applications and may comprise the following elements. This list of possible constituent elements is intended to be exemplary only, and it is not intended that this list be used to limit the composition of the present application to just these elements. Persons having ordinary skill in the art relevant to the present disclosure may understand there to be equivalent elements that may be substituted within the present disclosure without changing the essential function or operation of the composition.

The molecular architectural elements of the present disclosure may be a linear polymer, comb or brush polymer, or star polymer. Persons having ordinary skill in the art relevant to the present disclosure may understand that equivalent elements may be substituted within the present disclosure without limiting the scope of polymer architectures possible. The example polymer architectures without limitation include H-shaped, dumbbell shaped, or palm tree.

The various elements of the present disclosure may be related in the following exemplary fashion. It is not intended to limit the scope or nature of the relationships between the various elements and the following examples are presented as illustrative examples only.

By way of example, some embodiments of the present disclosure include pendant functional polyesters and copolyesters that are readily synthesized from alpha-hydroxy acids in a broad range of molecular weights and that are suitable for making fabricated and functional articles, such as films, molded products, sheets, filaments, coatings, foams, and surfactants. In embodiments, the polyesters may be synthesized using biobased raw materials and their degradation products may be non-toxic to humans and the environment, allowing them to be biodegradable or bioresorbable. The polyol components of the polyesters and copolyesters or the polyamine components of the polyamides and copolyamides may be selected to yield polymers that are water soluble, water dispersible, or hydrophilic, and additional pendant functional groups, such as alkyl, alkylaryl, hydroxyl, carboxylic acid, carboxylate salt, tertiary amino, quaternary amino, disulfide, sulfate, sulfonate, phosphoric acid, phosphate salt, and betaine groups may be introduced into the polyester architecture.

In some embodiments, the compounds of the present disclosure include sugar-based α-hydroxy carboxylic acid polyesters, polyamides, and polyesteramides having pendant functional groups. The sugar acid polyesters, polyamides, and polyesteramides of the present disclosure may be manufactured by the condensation polymerization of α-hydroxy and β-hydroxy diacid and polyacids with diols, diamines, amino alcohols, and polyols, and polyamines using chemoselective catalysts that enables preserving the stereoisomeric centers of the constituent sugar acids, and the condensing polyol, polyamine or amino alcohol while enabling exceptional control of molecular weights and access to high molecular weights in excess of 10,000 Daltons for the resultant polymer.

In embodiments, the polycondensation polymers of the present disclosure comprising the following Formula I and Formula II:

Formula I

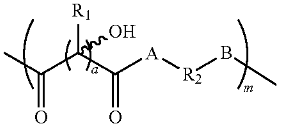

Formula II

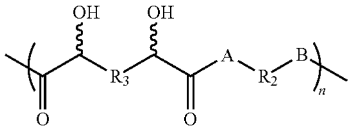

where 'A' and 'B' are independently selected from the group consisting of —O— and —NR—, such that, when A=B=—O—, polyesters; when A=B=—$NR_x$—, polyamides, and when A=—O— and B=—$NR_x$—, polyesteramides or when A=—$NR_x$—, and B=—O—, polyesteramides. $R_x$ is independently selected from H or from the group consisting of an optionally substituted alkyl, an optionally substituted cycloalkyl, an optionally substituted alkenyl, an optionally substituted cycloalkenyl, an optionally substituted alkynyl, an optionally substituted cycloalkynyl, an optionally substituted alkylaryl, and an optionally substituted aryl, with optional substituent selected independently at each occurrence thereof from the group consisting of —H, —OH, —COOH, amino, and combinations thereof.

In embodiments, a pendant hydroxyl containing polyesters and co-polyesters of the present disclosure comprise repeating units of the following Formula (III) and Formula (IV), stereoisomers, enantiomers of such polyesters, and mixtures thereof:

Formula (I)

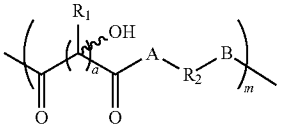

Formula (II)

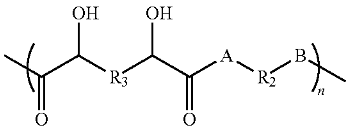

In embodiments, a pendant hydroxyl containing polyamides and co-polyamides of the present disclosure may comprise repeating units of the following Formula (V), Formula (VI), Formula (VII), Formula (VIII), enantiomers, stereoisomers, and mixtures thereof:

Formula (V)

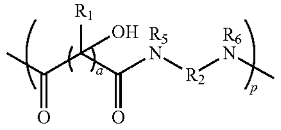

Formula (VI)

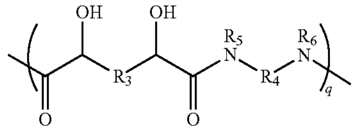

Formula (VII)

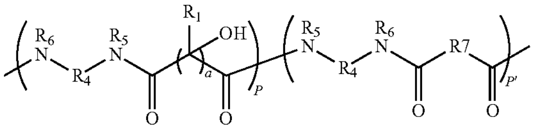

Formula (VIII)

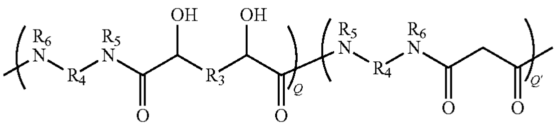

In embodiments, a pendant hydroxyl containing polyesteramides of the present disclosure may comprise repeating units of Formula (IX), Formula (X), Formula (XI), and Formula (XII), enantiomers, stereoisomers, and mixtures thereof:

Formula (IX)

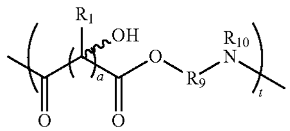

Formula (X)

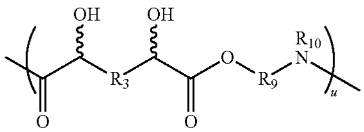

Formula (XI)

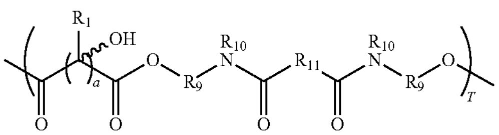

Formula (XII)

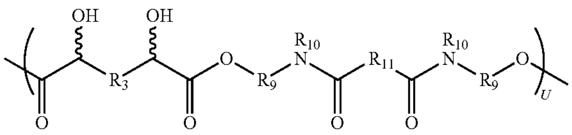

In embodiments, a star-shaped polyester, or polyesteramide, where in the core is a polyol, polyamine, or an amino alcohol and the first arm is selected from an alpha-hydroxy acid radical. The subsequent arms can be built as polyesters, polyamides, polyesteramides, polyesterethers.

In embodiments with Formula (I), Formula (III), Formula (V), Formula (VII), and Formula (IX), $R_1$ is selected from the group consisting of a hydrogen, an optionally substituted alkyl, an optionally substituted cycloalkyl, and an optionally substituted aryl and mixtures thereof.

In embodiments with Formula (II), Formula (IV), Formula (VI), Formula (VIII), Formula (X), and Formula (XII), $R_3$ represents a bivalent radical selected from the group consisting of (i) $(CH_2)_y$, wherein 'y' is an integer between 0 and 8; (ii) $R^aCH$, wherein $R^a$ is selected from the group consisting of alkyl, cycloalkyl, and aryl.

In embodiments, $R_2$, $R_4$, $R_5$, and $R_9$ independent represent a bivalent radical selected from the group consisting of (i) $(CH_2)_y$, wherein 'y' is an integer between 2 and 24;

(ii) ($—R^bCH—CHR^c—$), wherein $R^b$ and $R^c$ are independently selected from the group consisting of hydrogen or an optionally substituted alkyl, an optionally substituted cycloalkyl, an optionally substituted alkenyl, an optionally substituted alkynyl, an optionally substituted alkylaryl, or an optionally substituted aryl, with an optional substituent selected independently at each occurrence thereof from the group consisting of —H, —OH, —COOH, amino, and combinations thereof;

(iii) $—R^d$-E-$R^e—$ in which 'E' is —O—, or $—NR^f—$, or a quaternary nitrogen $—NR^gR^h—$, or —S—, or —SO—, and $—SO_2—$, and $R^d$, and $R^e$ are independently selected from the group consisting of hydrogen, alkyl, aryl, heteroaryl, and acyl, or $R^d$ and $R^e$ together form a methylene bridge of 2 to 24 carbon atoms, $R^f$, $R^g$, and $R^h$ are independently selected from the group consisting of hydrogen, alkyl, aryl, alkylaryl, heteroaryl; and (iv) a straight chain or pendant multiple alkylene oxide units or carbonate units or ester units or siloxane units of up to 5000 units.

In embodiments, $R_8$ represents a bivalent radical selected from the group consisting of:

(i) $(CH_2)_y$, wherein 'y' is an integer between 2 and 24;

(ii) ($—R^bCH—CHR^c—$), wherein $R^b$ and $R^c$ are selected from the group consisting of hydrogen or an optionally substituted alkyl, an optionally substituted cycloalkyl, an optionally substituted alkenyl, an optionally substituted alkynyl, an optionally substituted alkylaryl, or an optionally substituted aryl, with a substituent selected independently at each occurrence thereof from the group consisting of —H, —COOH, primary amine, secondary amine, tertiary amine or quaternary amine, and combinations thereof;

(iii) $—R^d$-D-$R^e—$ in which 'D' is —O—, or $—NR^f—$, or a quaternary nitrogen $—NR^gR^h—$, or —S—, or —SO—, and $—SO_2—$, and $R^d$, and $R^e$ are independently selected from the group consisting of hydrogen, alkyl, aryl, heteroaryl, and acyl, or $R^d$ and $R^e$ together form a methylene bridge of 2 to 24 carbon atoms, $R^f$, $R^g$, and $R^h$ are independently selected from the group consisting of hydrogen, alkyl, aryl, alkylaryl, heteroaryl.

(iv) a straight chain or pendant multiple alkylene oxide units or carbonate units or ester units or siloxane units of up to 5000 units.

In embodiments, $R_6$, $R_7$, and $R_{10}$ are independently selected from the group consisting of hydrogen or an optionally substituted alkyl, an optionally substituted cycloalkyl, an optionally substituted alkenyl, and optionally substituted cycloalkenyl, an optionally substituted alkynyl, an optionally substituted cycloalkynyl, an optionally substituted alkylaryl, and an optionally substituted aryl, with a substituent selected independently at each occurrence thereof from the group consisting of —OH, —COOH, halogen, amino, and combinations thereof.

As used herein, the wavy bond denotes that the stereochemistry at the chiral carbon center is either dextro (D-) or levo (L-) or a mixture of the two.

In Formula (I), Formula (III), Formula (V), Formula (VII), and Formula (VIII), 'a' represents an integer from 1 to 6.

In Formula (I) and Formula (II), 'm' and 'n' each represent an integer such that a number average molecular weight of the repeating unit is between 200 and 1,500,000 Dalton (Da), more preferably between 200 and 1,000,000 Da, and most preferably between 200 and 500,000 Da.

In Formula (III) and Formula (IV), 'p' and 'q' each independently represent an integer such that a number average molecular weight of the polyester is between 200 and 500,000 Da, more preferably between 200 and 250,000 Da, and most preferably between 200 and 150,000 Da.

In Formula (V), Formula (VI), Formula (VII), and Formula (VIII), 'r', 's', 'Z', 'Z'', 'S', and 'S'' each represent an integer such that a number average molecular weight of the repeating unit is between 200 and 1,500,000 Dalton (Da), more preferably between 200 and 1,000,000 Da, and most preferably between 200 and 500,000 Da.

In Formula (IX), Formula (X), Formula (XI), and Formula (XII), 't', 'u', 'T', 'T'', 'U', and 'U'' each represent an integer, such that the number average molecular weight of the polyesteramide is between 200 and 500,000 Dalton (Da), more preferably between 200 and 300,000 Da, and most preferably between 200 and 200,000 Da.

For the purposes of this invention, the term "polymer" preferably refers to a material composed of macromolecules containing >10 repeat units. For example, the repeat unit for polyester is an ester unit, the repeat unit for polyamide is an amide unit, and the repeat unit or a polyesteramide is one amide unit and one ester unit.

For the purposes of this invention, the term "oligomer" preferably refers to a material composed of macromolecules containing >2-10 repeat units.

A person skilled in the art knows the meaning of the terms "branched polymer", "unbranched polymer", and "crosslinked polymer".

The term "alkyl" refers to an aliphatic hydrocarbon group which may be straight or branched having about 1 to about 24 (e.g., 1, 2, 3, 4, 5, 6, 7, 8, 9, 10, 11, 12, 13, 14, 15, 16, 17, 18, 19, 20, 21, 22, 23, 24) carbon atoms in the chain, unless otherwise specified. Branched means that one or more lower alkyl groups such as methyl, ethyl, propyl or butyl are attached to a linear alkyl chain.

The term "alkenyl" refers to an aliphatic hydrocarbon group containing one or more carbon-carbon double bonds, and which may be straight or branched having about 2 to about 24 (e.g., 2, 3, 4, 5, 6, 7, 8, 9, 10, 11, 12, 13, 14, 15, 16, 17, 18, 19, 20, 21, 22, 23, 24) carbon atoms in the chain. Exemplary alkenyl groups include ethenyl, propenyl, n-butenyl, iso-butenyl and the like.

The term "alkynyl" means an aliphatic hydrocarbon group containing one or more carbon-carbon triple bonds, and which may be straight or branched having about 2 to about 24 (e.g., 2, 3, 4, 5, 6, 7, 8, 9, 10, 11, 12, 13, 14, 15, 16, 17, 18, 19, 20, 21, 22, 23, 24) carbon atoms in the chain. Preferred alkynyl groups have 2 to about 6 (e.g., 2, 3, 4, 5, 6) carbon atoms in the chain. Exemplary alkynyl groups include ethynyl, propynyl, n-butynyl, 2-butynyl, 3-methylbutynyl, n-pentynyl, and the like.

The term "cycloalkyl" refers to a non-aromatic saturated mono- or polycyclic ring system which may contain 3 to 24 (e.g., 3, 4, 5, 6, 7, 8, 9, 10, 11, 12, 13, 14, 15, 16, 17, 18, 19, 20, 21, 22, 23, 24) carbon atoms. Exemplary cycloalkyl groups include, without limitation, cyclopropyl, cyclobutyl, cyclopentyl, cyclohexyl, and the like.

The term "cycloalkenyl" refers to a non-aromatic unsaturated mono- or polycyclic ring system which may contain 3 to 12 (e.g., 3, 4, 5, 6, 7, 8, 9, 10, 11, or 12) carbon atoms, and which includes at least one double bond. Exemplary cycloalkenyl groups include, without limitation, cyclopropenyl, cyclobutenyl, cyclopentenyl, cyclohexenyl, and the like.

As used herein, the term "aryl" refers to an aromatic monocyclic or polycyclic ring system containing from 6 to 19 (e.g., 6, 7, 8, 9, 10, 11, 12, 13, 14, 15, 16, 17, 18, or 19) carbon atoms, where the ring system may be optionally substituted. Aryl groups of the present invention include, but are not limited to, groups such as phenyl, naphthyl, phenanthrenyl, anthracenyl, fluorenyl, pyrenyl, triphenylenyl, chrysenyl, and naphthacenyl, and the like.

As used herein, the term "heteroaryl" refers to an aromatic ring radical which consists of carbon atoms and from one to five (e.g., 1, 2, 3, 4, or 5) heteroatoms selected from the group consisting of nitrogen, oxygen, sulfur. Examples of heteroaryl groups include, without limitation, pyrrolyl, pyrazolyl, imidazolyl, triazolyl, furyl, thiophenyl, oxazolyl, isoxazolyl, thiazolyl, isothiazolyl, oxadiazolyl, thiadiazolyl, pyridyl, pyrazinyl, pyrimidinyl, pyridazinyl, triazinyl, thienopyrrolyl, furopyrrolyl, indolyl, azaindolyl, isoindolyl, indolinyl, indolizinyl, indazolyl, benzimidazolyl, imidazopyridinyl, benzotriazolyl, benzoxazolyl, benzoxadiazolyl, benzothiazolyl, pyrazolopyridinyl, triazolopyridinyl, thienopyridinyl, benzothiadiazolyl, benzofuyl, benzothio phenyl, quinolinyl, isoquinolinyl, tetrahydroquinolyl, tetrahydroisoquinolyl, cinnolinyl, quinazolinyl, quinolizilinyl, phthalazinyl, benzotriazinyl, chromenyl, naphthyridinyl, phenanzinyl, phenothiazinyl, phenoxazinyl, pteridinyl, and purinyl and the like.

The term "halogen" as used herein refer to an atom selected from fluorine, chlorine, bromine and iodine.

The term "amino", as used herein, refers to a primary (—$NH_2$), secondary (—$NHR^i$), tertiary (—$NR^iR^j$) or quaternary (—$N^+R^iR^jR^k$) amine, where $R^i$, $R^j$ and $R^k$ are independently an aliphatic, alicyclic, heteroaliphatic, heterocyclic, aromatic or heteroaromatic moiety, as defined herein. Examples of amino groups include, but are not limited to, methylamino, dimethylamino, ethylamino, diethylamino, diethylaminocarbonyl, methylethylamino, iso-propylamino, piperidino, trimethylamino, and propylamino.

As used herein, an aldaric acid is a derivative of an aldose carbohydrate in which the terminal aldehyde and alcohol groups have been converted to carboxylic acids. In some embodiments, $R_1$ from Formula (I), Formula (III), Formula (V), Formula (VII), and Formula (IX) includes radicals derived from α-hydroxy acids, such as aldaric acid, example of which include without limitation, tartronic acid, tartaric acid, mucic acid, saccharic acid. The aldaric acid can be in any enantiomeric form. Other aldaric acids include, mannaric, idaric, allaric, altraric, ribaric, xylaric, and arabinaric acids.

The term "optionally substituted" is used to indicate that a group may have a substituent at each substitutable atom of the group (including more than one substituent on a single atom), provided that the designated atom's normal valency is not exceeded, and the identity of each substituent is independent of the others. Up to three H atoms in each residue can be replaced with an alkyl, halogen, haloalkyl, hydroxy, lower alkoxy, carboxy, carboalkoxy (also referred to as alkoxycarbonyl), carboxamido (also referred to as alkylam inocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. "Unsubstituted" atoms bear all the hydrogen atoms dictated by their valency.

The term "substituted" means that one or more hydrogen on a designated atom is replaced with a selection from the indicated group, provided that the designated atom's normal valency is not exceeded. "Unsubstituted" atoms bear all the hydrogen atoms dictated by their valency. When a substituent is —O—, then 2 hydrogens on the C atom are replaced. Combinations of substituents are permissible only if such combinations result in stable compounds. By "stable compound" it is meant a compound that is sufficiently robust to survive isolation to a useful degree of purity from a reaction mixture. Exemplary substituents are, without limitation, oxo, thio, nitro, cyano, halogen, —OH, —$NH_2$, $C_1$-$C_6$ alkyl, $C_1$-$C_6$ alkoxy, $C_2$-$C_6$ alkenyl, $C_2$-$C_6$ alkynyl, $C_3$-$C_7$ cycloalkyl, aryl, and heteroaryl.

In some embodiments, $R_3$ from Formula (II), Formula (IV), Formula (VI), Formula (VIII), Formula (X), and Formula (XII) may include radicals derived from α-hydroxy acids, such as tartronic acid, tartaric acid, 1,4-phenylenediglycolic acid, 1,3-phenylenediglycolic acid, 1,2-phenylenediglycolic acid, stereoisomers thereof, and mixtures thereof.

As used herein, the term "chemoselective" refers to a selective reaction at a single functional group within a compound that contains multiple functional groups.

As used herein, the term "polycondensation polymer" refers to a polymer formed from repeated condensation reactions. The condensation reactions of choice in the present disclosure are esterification and amidation and the polymers formed as a results are polyesters and polyamides.

The term "amphiphile" as used herein refer to molecules comprising of, both, a non-polar moiety and a polar moiety. The non-polar moiety which, if separate from the amphiphile, would have a substantially greater solubility in, or a greater attraction to, an organic solvent, (e.g., acetonitrile, hexane, oil, and the like) than water, whereas the second portion (usually at least partially polar) which, if separate from the amphiphile, would be soluble in water.

As used here-in, the term "cationic polymer" refers to water-soluble and/or water-dispersible polymers, which have a positive net charge.

As used here-in, the term "anionic polymer" refers to water-soluble and/or water-dispersible polymers, which have a negative net charge.

As used here-in, the term "non-ionic polymer" refers to water-soluble and/or water-dispersible polymers, which have a substantially no net charge.

As used herein, the term "mixed charge copolymer" refers to a copolymer having a polymer backbone, a plurality of repeating units having a positive charge, and a plurality of repeating units having a negative charge.

As used here-in, the term "zwitterionic polymer" refers to water-soluble and/or water-dispersible polymers, which have a plurality of repeating units having diionic or zwitterion pendant groups such that the net charge per unit is effectively zero. Typical pendant zwitterion pendant groups, include without limitation, carboxybetaine, sulfobetaine, and phophorylcholine.

As used herein "water-dispersible" polymer comprises of hydrophobic groups in the main chain or pendant to a hydrophilic backbone. These polymers solids or solutions can be dispersed into smaller particles of micrometer or nanometer dimensions upon contacting with water or aqueous solutions.

The term "star polymer or copolymer" refers to a branched polymer or copolymer in which two or more polymers or copolymer side chains extend from the nucleus. Representative star-shaped polymers and copolymers of the present invention include two, three, four, five, six or more side chains extending from the nucleus. A nucleus is a group of atoms having two or more functional groups whose side chains can be extended by polymerization. Representative nuclei have two, three, four, five, six or more functional groups with extensible side chains.

By an "alpha-hydroxy acid" or "α-hydroxy acid" is meant a hydroxyl (—OH) functionality that is on the C atom bearing the carboxylic acid, e.g., a compound having the general formula:

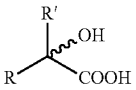

Where R, and R' are selected independently from H, alkyl or aryl radicals. Suitable α-hydroxy acids include, without limitation, tartronic acid, L-malic acid, D,L-malic acid, L-tartaric acid, D,L-tartaric acid, D,L-mandelic acid, (R)-(−)-mandelic acid, (S)-(+)-mandelic acid, 4-fluoro mandelic acid, 4-(trifluoromethyl)mandelic acid, 4-chloromandelic acid, 4-bromomandelic acid, 2-fluoromandelic acid, 2-chloromandelic acid, 2-bromomandelic acid, 3-hydroxymandelic acid, mucic acid, saccharic acid, L-ascorbic acid, D-(−)-isoascorbic acid, citric acid, benzylic acid, α-hydroxyisobutyric acid, glycolic acid, (±)-2-hydroxyoctanoic acid, 9-hydroxy-9-fluorenecarboxylic acid (Flurenol), (4R)-4-hydroxy-L-glutamic acid, D-(−)-quinic acid, α-hydroxyhippuric acid, 1,4-phenylenediglycolic acid, 1,3-phenylenediglycolic acid, 1,2-phenylenediglycolic acid, α-hydroxy isocaproic acid, atrolactinic acid, α-hydroxy isovaleric acid, α-D-glucoheptonic acid (glucopehtonicacid), α-D-glucoheptonic γ-lactone, D-clucoheptono-1,4-lactone, 2,3,4,5,6-pentahydroxycaproic acid (gluconic acid), D-(+)-gluconic acid δ-lactone, glucolactone, glucuronolactone, glycolic acid, isopropylacetone acid esters, methyl acetone acid esters, galactaric acid, pyruvic acid, saccharic acid, saccharic acid 1,4-lactone, hydroxymalonic acid, α-hydroxyhippuric acid, α-hydroxy-γ-butyrolactone, R-(+)-α-hydroxy-γ-butyrolactone, S-(−)-α-hydroxy-γ-butyrolactone, D,L-pantolactone, D-(−)-pantolactone, (S)-(+)-pantolactone. Although beta hydroxy acids, in general, are not reactive and useful in this manufacture, specific beta hydroxy acids that follow the use of this catalysis route include 2,5-dihydroxyterephtahlic acid and are of value in making aliphatic-aromatic or aromatic-aromatic polyesters, polyamides and polyesteramides.

In some embodiments, $R_2$ may include radicals, such as a "polyol" selected from the group consisting of ethylene glycol, diethylene glycol, triethylene glycol, tetraethylene glycol, 1,3-propanediol, 1,2-propanediol, 2-methyl-1,3-propanediol, 1,4-butanediol, 1,2-butanediol, 2,3-butanediol, 1,3-butanediol, 1,5-pentanediol, 1,2-petanediol, 2-methyl-2-ethyl-1,3 propanediol, neopentyl glycol, 2-ethyl-1,3-hexanediol, 1,6-hexanediol, 1,2-hexanediol, 1,7-heptanediol, 1,2-heptanediol, 1,8-octanediol, 1,2-octanediol, 1,9-nonanediol, 1,2-nonediol, 1,10-decanediol, 1,2-decanediol, 1,12-dodecanediol, 1,2-dodecanediol, 1,18-octadecanediol, 1,2-octadecanediol, cyclopentanediol, 1,2-dimethyl-1,2-cyclopentanediol, 1,4-cyclohexanediol, 1,4:3,6-dianhydro-D-sorbitol, 1,4:3,6-dianhydro-D-mannitol, 1,4:3,6-dianhydro-D-iditol, 1,4-cyclohexanedimethanol, 1,2-cyclohexanedimethanol, 1,4-benzenedimethanol, hydroxybenzyl alcohol, dihydroxytoluene bis(2-hydroxyethyl) terephthalate, 2,2,4,4-tetramethyl-1,3-cyclobutanediol, 1,4-bis(hydroxyethyl)piperazine, N,N'-bis(2-hydroxyethyl)oxamide, xylitol, sorbitol, ribitol, mannitol, erythritol, glycerin, lactitol, maltitol, isomalt, 2,5-bis(hydroxymethyl) tetrahydrofuran, 2,5-bis(hydroxymethyl)furan, hydroxymethylfurfuryl, ethoxlated or propoxylated derivatives of these, stereoisomers of these, and combinations thereof.

In certain embodiments, the term "polyol" can be a saccharide, a chemical unit comprising a monosaccharide, a disaccharide, or an oligosaccharide.

The monosaccharide can be, without limitation, a substituted or unsubstituted triose, triulose, tetrose, tetulose, pentose, pentulose, hexose, hexulose, heptose, or heptulose, in its dextro (D-) or levo (L-) form. Exemplary monosaccharides include, without limitation, a substituted or unsubstituted, erythrose, threose, ribose, arabinose, xylose, lyxose, allose, altrose, glucose, mannose, gulose, idose, galactose, talose, fucose, fructose, erythrulose, ribulose, xylulose, psicose, sorbose, tagatose, and derivatives thereof, such as aldonic, and uronic acids (e.g., gluconic acid, mannuronic acid, glucuronic acid, galacturonic acid, mannuronic acid, xyluronic acid), deoxy sugars (e.g., deoxyribose, rhamnose, and fucose), and amino sugars (e.g., glucosamine, galactosamine, N-acetylmuramic acid), and the like. Other monosaccharides suitable for use in the monomers and polymers as described herein are well known in the art.

Disaccharides comprise of two monosaccharides linked together by glycosidic bonds, and oligosaccharides comprise more than two, usually three to ten monosaccharides linked together by glycosidic bonds. A disaccharide or oligosaccharide containing unit of the monomers and polymers as described herein may comprise one type, or more than one type, of monosaccharide. Exemplary disaccharides include, without limitation, sucrose, lactose, maltose, trehalose, cellobiose, isomaltose, maltitol, and the like. Exemplary oligosaccharides include, without limitation, fructo-oligosaccharides, galacto-oligosaccharides, gluco-oligosaccharides, raffinose, cyclic oligosaccharides, such as cyclodextrins, and the like.

The polymeric polyol used in the present invention, comprises of polymers with at least two hydroxyl groups covalently attached. While the polyol is preferably a diol, polymers greater than two hydroxyl groups are also utilized, such as polymeric polyols having 3-100 hydroxyl groups, or from 3-50 hydroxyl groups, or from 3-12 hydroxyl groups. Suitable polymeric polyols can include without limitation polyester polyol, a polyether polyol, a polycarbonate polyol, an acrylic polyol, or mixtures thereof.

Suitable aliphatic polyester polyols can include without limitation linear polyester diols accessed from aliphatic or cycloaliphatic dicarboxylic having 2 to 20 carbon atoms, such as adipic acid, succinic acid, furandioic acid, dodecanedioic acid, dimer diacid, such as 12-hydroxy stearic acid and ricinoleic acid, copolymers, and terpolymers and the like or their mixtures with polyhydric alcohols, such as ethanediol, di-, tri-, tetraethylene glycol, 1,2-propanediol, di-, tri-, tetrapropylene glycol, 1,3-propanediol, 1,4-butanediol, 1,3-butanediol, 2,3-butanediol, 1,5-pentanediol, 1,6- hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol or mixtures thereof can be produced.

Polyester polyols accessed by the polycondensation of aliphatic diols having 2-20 carbon atoms, such as, but not limited to, ethylene glycol, 1,2-propanediol, 1,3-propanediol, 1,4-butanediol, 1,3-butanediol, 2,3-butanediol, dimer diols with suitable organic diacids having 2-20 carbon atoms, such as, but not limited to, adipic acid, furan dioic acid, terephthalic acid, phthalic acid, 2,6-naphthalenedicarboxylic acid, isomers of naphthalenedicarboxylic acid, dodecanedioic acid, dimer diacid, such as 12-hydroxy stearic acid and ricinoleic acid, copolymers, and terpolymers and the like.

The polyester polyols can also be accessed by the ring opening polymerization of cyclic lactones without limitation, such as glycolide, L-lactide, D-lactide, D,L-lactide, γ-butyrolactone, ε-caprolactone, or mixtures thereof using a polyol, such as ethylene glycol, 1,3-propanediol, 1,2-propanediol, 1,4-butanediol, 1,3-butanediol, 2,3-butanediol, 1,6-hexanediol, trimethylolpropane, di(trimethylolpropane), pentaerythritol, dipentaerythritol, sorbitol, or mannitol as the initiator, resulting in linear and star-shaped architectures. A polyester polyol accessed by the reaction of a polycarboxylic acid, such as maleic acid or phthalic acid and an alkylene polyol such as ethylene glycol or propylene glycol to react with each other.

Exemplary polyether polyol, but are not limited to, such as that obtained by reacting alkylene polyol, such as ethylene glycol or propylene glycol and an alkylene oxide such as ethylene oxide or propylene oxide to react with each other.

Exemplary polycarbonate diol, but are not limited to, such as that obtained by reacting an alkylene carbonate such as ethylene carbonate or trimethylene carbonate and an alkylene polyol such as ethylene glycol or 1,3-propanediol.

A homopolymer of a hydroxyl group-containing acrylic monomer, such as 2-hydroxyethyl(meth)acrylate or hydroxypropyl (meth)acrylate, and a copolymer of the hydroxyl group-containing acrylic monomer and a radically polymerizable unsaturated monomer such as acrylic acid or styrene.

The polyol can be selected from carbinol terminated siloxanes, where the siloxane backbone $(R^{l}R^{m}Si—O—)_t$ repeat units ‘t’ can number between 2-5000. $R^l$ and $R^m$ are independently selected from methyl, phenyl, and pendant flurocarbon radicals or a combination thereof. The polyol alternatively be selected from fluorinated polyols, such as, but not limited to, $(Z\ (CH_2)_uOH(CH_2)_vOH)$ wherein Z, is a perfluoroalkane radical having from 4 to 12 carbon atoms and ‘u’ and ‘v’ are integers between 1 to 8.

A polyether amine will be understood to as referring to a compound having two or more amine groups attached to a polyether backbone such as one characterized by propylene oxide, ethylene oxide, or mixed propylene oxide and ethylene oxide repeating units in their respective structures. Examples of such polyetheramines include aminated propoxylated pentaerythritols.

Manufacturing a polyester, polyamide and polyesteramide of Formulas (I) through (X) comprises using boron catalysts, such as boric acid and/or boronic acid catalysts at a concentration of from less than 1000 ppm. The boron catalysis may, preferably, comprise boric acid, boric anhydride, ammonium tetraborate tetrahydrate, ammonium pentaborate tetrahydrate, ammonium pentaborate octahydrate, and boronic acids, diboroxanes, boroxines, or mixtures thereof. The boronic acids are of the general formula $R''B(OH)_2$, where R" is a suitable alkyl, substituted alkyl, alkenyl, aryl, or substituted aryl, heteroaryl, or substituted heteroaryl moiety. Exemplary boronic acids include, but are not limited to, methylboronic acid, ethylboronic acid, 1-propylboronic acid, 1-butylboronic acid, 1-hexylboronic acid, 1-octylboronic acid, 1-nonylboronic acid, 1-decylboronic acid, 1-dodecylboronic acid, 1,4-Dioxaspiro[4,5]dec-7-en-8-boronic acid, 1-pentenylboronic acid, 4-tert-butylcyclohexene-1-boronic acid, 2-tert-butyl-trans-vinylboronic acid, cyclopentene-1-boronic acid, 2-norbornene-2-boronic acid, trans-1-octenylboronic acid, phenylboronic acid, 1-napthaleneboronic acid, 1,4-benzenediboronic acid, 3,4,5-trifluorobenzeneboronic acid, 3,5-bis(trifluoromethyl)phenyl boronic acid, 3-nitrobenzeneboronic acid, N-alkyl-4-boronopyridinium halides. These boronic acid as supplied commercially can have as impurities, such as boroxanes, boroxines that are formed because of dehydration reactions even at room temperatures. The boronic acid can be optionally polymer supported, normally accessed as copolymers. Exemplary representatives without limitations are phenylboronic acid that are crosslinked-polystyrene supported, or polyacrylamide supported, boronic acid-modified polyethylene oxide, poly(3-acrylamidophenylboronic acid), its copolymers and mixtures thereof.

A method of producing a pendant hydroxyl containing polyesters of Formula (I) and Formula (II) may comprise a chemoselective catalytic polycondensation of the α-hydroxy acid or a mixture thereof with a polyol or mixture of polyol in the presence of boron catalysts at a temperature greater than about 70° C. at atmosphere pressures or higher pressures and in the presence of boric acid or boronic acid or mixtures thereof as a catalyst for a predetermined reaction time followed by further polycondensation by elimination of small molecular weight byproducts and impurities at a temperature of up to about 280° C. under reduced pressure.

Whereas it is environmentally and economically advantageous to carry out the polycondensation reactions without the need of an entrainer that removes the small molecules of polycondensation, such as water, it is understood by those skilled in the art that media such as, without limitation, benzene, toluene, xylene, or chlorobenzene, n-hexane, cyclohexane, methyl cyclohexane, n-heptane, and mixtures thereof, can be employed advantageously to distill the water of condensation as an azeotrope.

The polyesters, polyamides, and polyesteramides of the present disclosure, after adjusting for their molecular weight, may have properties and viscosity values that make them suitable for use in practical applications. For example, the compounds of the present disclosure may be utilized in manufacturing surface active articles, surfactants, polymeric surfactants, adjuvants, compatibilizing agents, surface modifiers, coupling agents, and the like. Moreover, the compounds may be used to make shaped articles, films, fabrics, foams, injection molded products, coatings, thermoformed products, extruded profiles and sheets, extrusion blow bolded items, injection blow molded items, rotomolded items, stretch blow molded items, manufacturing additives, and the like.

The polyesters, polyamides, and polyesteramides of the present disclosure are excellent ligands for many metal ions for which the oxygen atoms from the —OH groups are the primary sites of coordination. Optionally, the C═O and —OH groups of pendant carboxylic acid, the N or S atoms from the amino and sulfide, and sulfo groups can provide additional coordination sites. Coordination may also be induced from the C═O groups of the ester groups and N atoms of the amide, —C═O(NR$_x$)—, groups. Generally, the metal ions are chosen from the alkali metals, alkaline earth metals, transition metals, lanthanides, and actinides of the periodic table of elements.

The polyesters, polyamides, and polyesteramides of the present disclosure provide value in term of reaction centers or functionalities of —OH, —COOH, amino, C═C centers, C≡C centers for conjugation of organic and bioorganic molecules. The conjugated polymers can act as therapeutic agents or delivery systems, and targeted delivery systems for agricultural, pharmaceutical, cosmetics, and nutrition compositions. The polyesters, polyamides, and polyesteramides of the present disclosure provide value in term of reaction centers or functionalities of —OH, —COOH, amino, C═C centers, C≡C centers for conjugation of organic and bioorganic molecules. The conjugations may optionally result in crosslinked gels. The conjugated polymers can act as therapeutic agents or delivery systems, and targeted delivery systems for agricultural, pharmaceutical, cosmetics, and nutrition compositions."

Examples: As illustrated in the examples below, depending on comonomer composition, regular, segmented, or random polyhydroxylated polyesters, polyhydroxylated polyamides, and polyhydroxylated polyesteramides can be built. The reactions described in the various examples are carried out for a theoretical yield of 500 g, unless specified otherwise.

Example 1: 285.9 g L-(+)-tartaric acid, 267.93 g 2-methyl-1,3-propanediol, and 35 mg boric acid were charged into a 1 liter 4 neck round bottom flask equipped with an overhead stirrer, nitrogen gas purge, thermocouple thermometer, and a distillation adaptor with a water-cooled condenser. The round bottom flask was heated using a heating mantle. The other end of the condenser was connected to a two-neck round bottom receiver flask submerged in an ice-cold water-bucket. The other neck of the round bottom flask is optionally open or connected to a vacuum line. Prior to the start of the reaction, the contents were evacuated of air by exchanging nitrogen and vacuum and keeping the flask contents under nitrogen atmosphere. The reaction mixture was heated to 150° C. and maintained at that temperature for three hours, when about 53 g of the water was collected. After all the collected water was drained, the reaction system was held under vacuum of <1 Torr. The reaction temperature was raised to 215° C. over a period of 10 hours, during which time some of the diol distilled out to yield a highly viscous pale tan product. When no more distillate was observed, the vacuum was broken, and the product cooled to room temperature under nitrogen blanket to yield 84% polyester solid. The product was hygroscopic and completely water soluble. The structural formula for the resulting compound is shown in FIG. 1. FIGS. 2-5 show different data associated with the resulting compound.

Example 2: 227.80 g L-(+)-tartaric acid, 126.84 g 1,3-propanediol, 200 g 1,4:3,6-Dianhydro-D-sorbitol, and 13 mg boric acid was charged into a 1 liter 4 neck round bottom flask equipped with an overhead stirrer, Nitrogen gas purge, thermocouple thermometer, and a short path distillation adaptor with a water-cooled condenser. The round bottom flask was heated using a heating mantle. The other condenser was connected to a two-neck round bottom flask that in turn was connected to a vacuum line/nitrogen vent. Prior to the start of the reaction, the contents were evacuated of air by exchanging nitrogen and vacuum before keeping the flask contents under nitrogen atmosphere. The reaction mixture was heated to 150° C. and maintained at that temperature for three hours, when about 55 g of water was collected. After all the collected water was drained, the reaction system was held under vacuum of <1 Torr. The reaction temperature was raised to 215° C. over a period of 6 hours, during which time some mixture of the diols distilled out to yield a viscous pale tan product. The vacuum was broken, and the product was cooled to room temperature under nitrogen blanket to yield 89% solid polyester. The product was completely water soluble.

Example 3: 274.05 g L-(+)-tartaric acid, 241.67 g 1,3-propanediol, 50.01 g 2-amino-2-methyl-1,3-propanediol, and 16 mg boric acid was charged into a 1 liter 4 neck round bottom flask equipped with an overhead stirrer, Nitrogen gas purge, thermocouple thermometer, and a short path distillation adaptor with a water-cooled condenser. The round bottom flask was heated using a heating mantle. The other condenser was connected to a two-neck round bottom flask that in turn was connected to a vacuum line/nitrogen vent. Prior to the start of the reaction, the contents were evacuated of air by exchanging nitrogen and vacuum before keeping the flask contents under nitrogen atmosphere. The reaction mixture was heated to 150° C. and maintained at that temperature for three hours, when about 66 g of water was collected. After all the collected water was removed, the reaction system was held under vacuum of <1 Torr. The reaction temperature was raised to 210° C. over a period of 8 hours, during which time some mixture of the diols distilled out to yield a viscous pale-yellow product. The vacuum was broken, and the product was cooled to room temperature under nitrogen blanket to yield 81% solid polyester. The product was completely water soluble.

Example 4: 237.16 g L-(+)-tartaric acid, 639.45 g 1,2-dodecanediol, and 100 mg boric acid were charged into a 1 L 4 neck round bottom flask equipped with an overhead stirrer, nitrogen gas purge, thermocouple thermometer, and a distillation adaptor with a water-cooled condenser. The round bottom flask was heated using a heating mantle. The other end of the condenser was connected to a two-neck round bottom receiver flask that in turn was connected to a vacuum line/nitrogen vent. Prior to the start of the reaction, the contents were evacuated of air by exchanging nitrogen and vacuum and keeping the flask contents under nitrogen atmosphere. The reaction mixture was heated to 150° C. and maintained at that temperature for three hours, when about 53 g of water was collected. After all the collected water was drained, the reaction system was held under vacuum of <1 Torr. The reaction temperature was raised to 225° C. over a period of 8 hours, during which time some of the diol distilled out to yield a highly viscous pale tan product. When no more distillate was observed, the vacuum was broken, and the product cooled to room temperature under nitrogen blanket to yield 82% polyester solid. The product was water dispersible.

Example 5: 257.44 g L-(+)-tartaric acid, 208.38 g 1,3-propanediol, 100.01 g 2,2-bis(hydroxymethyl)propionic acid, and 27 mg boric acid was charged into a 1 liter 4 neck round bottom flask equipped with an overhead stirrer, Nitrogen gas purge, thermocouple thermometer, and a short path distillation adaptor with a water-cooled condenser. The round bottom flask was heated using a heating mantle. The other end of the condenser was connected to a two-neck round bottom flask that in turn is connected to a vacuum line/nitrogen vent. Prior to the start of the reaction, the contents were evacuated of air by exchanging nitrogen and vacuum before keeping the flask contents under nitrogen atmosphere. The reaction mixture was heated to 150° C. and maintained at that temperature for three hours, when about 62 g of water of reaction was collected. After all the collected water was removed, the reaction system was held under vacuum of <1 Torr. The reaction temperature was slowly raised to 215° C. over a period of 8 hours, during which time some mixture of the diols distilled out to yield a viscous, clear to faintly yellow product that climbs on the stirrer shaft. The vacuum was broken, and the product was cooled to room temperature under nitrogen blanket to yield (83%) solid polyester. The product was characterized by FTIR.

Example 6: 300.22 g L-(+)-tartaric acid, 121.45 g 2-Amino-2-methyl-1,3-propanediol, 117.88 g 2,2-bis(hydroxymethyl)propionic acid, and 19 mg boric acid were charged into a 1 liter 4 neck round bottom flask equipped with an overhead stirrer, nitrogen gas purge, thermocouple thermometer, and a distillation adaptor with a water-cooled condenser. The round bottom flask was heated using a heating mantle. The other end of the condenser was connected to a two-neck round bottom receiver flask that in turn is connected to a vacuum line/nitrogen vent. Prior to the start of the reaction, the contents were evacuated of air by exchanging nitrogen and vacuum and keeping the flask contents under nitrogen atmosphere. The reaction mixture was heated to 150° C. and maintained at that temperature for three to four hours, when about 36 g of water of reaction was collected. After all the collected water was drained, the reaction system was held under vacuum of <1 Torr. The reaction temperature was then raised to 180° C. slowly over a 90-minute period, during which time some of the diol distilled out to yield a highly viscous colorless product. When no more distillate was observed and the viscous polymer starts climbing the stirrer shaft, the vacuum was broken, and the product cooled to room temperature under nitrogen blanket to yield 96% polyester solid. The product is a water-soluble polyester having both acidic and basic functionalities.

Example 7: 50 g of dry polyester of example 3 was transferred to a 250 ml three neck round bottom flask equipped with an overhead stirrer, nitrogen blanketed addition funnel and water-cooled reflux condenser. The addition funnel was charged with 50 ml of anhydrous 1 molar chloromethane solution in methyl tertiary butyl ether and kept under Nitrogen blanket. The Polyester 3 was heated to 50° C. with mixing using the overhead stirrer, when the chloromethane solution was added in a drop wise manner over a period of an hour to yield a stringy slurry. The reaction was maintained at 50° C. for about 24 hours. The remaining solvent was distilled off and 52.4 g of quaternized water-soluble cationic polyester was recovered.

Example 8: 50 g of polyester of example 3 was transferred to a 250 ml three round bottom flask equipped with an overhead stirrer, nitrogen inlet and water-cooled reflux condenser. 5.60 g of sodium chloroacetate dissolved in 50 ml of deionized water was added to Polyester 3 with stirring at room temperature. The mixture was heated to 65° C. and the reaction continued for 12 hours. At the end of the reaction, the mixture was crashed into 250 ml of diethyl ether to yield a white stringy precipitate. The precipitate was filtered, washed with excess diethyl ether and dried at 70° C. in a vacuum oven for 48 hours to yield 55.2 g zwitterionic polyester.

Example 9: 302.24 g L-(+)-tartaric acid, 234.01 g 1,6-hexamethylenediamine, and 30 mg 3,5-bis(trifluoromethyl) phenyl boronic acid was charged into a 1 liter 4 neck round bottom flask equipped with an overhead stirrer, Nitrogen gas purge, thermocouple thermometer, and a short path distillation adaptor with a water-cooled condenser. The round bottom flask was heated using a heating mantle. The other end of the condenser was connected to a two-neck round bottom receiver flask that in turn is connected to a vacuum line/nitrogen vent. Prior to the start of the reaction, the contents were evacuated of air by exchanging nitrogen and vacuum before keeping the flask contents under nitrogen atmosphere. The reaction mixture was heated to 150° C. and maintained at that temperature for three hours, when water distillate was observed collecting into the receiver. The reaction temperature was slowly raised to 190° C. under a slight pressure of nitrogen when about 37 g of water of reaction was collected. The reaction temperature was further raised to 215° C. and held at that temperature for over a period of 8 hours to yield a highly viscous, tan product. The product was cooled to room temperature under nitrogen blanket to yield (99%) polyamide that is water soluble. The product was characterized by FTIR and NMR.

Example 10: 148.32 g adipic acid, 235.89 g 1,6-hexamethylenediamine, and 30 mg 3,5-bis(trifluoromethyl)phenyl boronic acid was charged into a 1 liter 4 neck round bottom flask equipped with an overhead stirrer, Nitrogen gas purge, thermocouple thermometer, and a short path distillation adaptor with a water-cooled condenser. The round bottom flask was heated using a heating mantle. The other end of the condenser was connected to a two-neck round bottom receiver flask that in turn is connected to a vacuum line/nitrogen vent. Prior to the start of the reaction, the contents were evacuated of air by exchanging nitrogen and vacuum before keeping the flask contents under nitrogen atmosphere. The reaction mixture was heated to 170° C. and maintained at that temperature for three hours, when water distillate was observed collecting into the receiver including a tan molten mass in the reactor. Once no more water was observed condensing into the receiver flask, 152.33 g L-(+)-tartaric acid was charged into the reactor under nitrogen blanket. The reaction temperature was slowly raised to 200° C. under a slight pressure of nitrogen and the slush becomes a molten mass. Additional water was observed to collect in the receiver vessel. Once no more water condensate was observed to drip into the receiver vessel, the reaction content was held at 210° C. for additional 8 hours at which point a viscous tan product that climbs on the reactor shaft. Total weight of water condensate collected was about 37 mg. The product was cooled to room temperature under nitrogen blanket to yield (99%) solid copolyamide. The product was characterized by FTIR and NMR.

Example 11: 346.53 g L-(+)-tartaric acid, 138.98 g 1,3-propanediol, 56.05 g 1,6-hexamethylenediamine, and 26 mg boric acid and 72 mg 3,5-bis(trifluoromethyl)phenyl boronic acid were charged into a 1 liter 4 neck round bottom flask equipped with an overhead stirrer, nitrogen gas purge, thermocouple thermometer, and a distillation adaptor with a water-cooled condenser. The round bottom flask was heated using a heating mantle. The other end of the condenser was connected to a two-neck round bottom receiver flask that in turn is connected to a vacuum line/nitrogen vent. Prior to the start of the reaction, the contents were evacuated of air by exchanging nitrogen and vacuum and keeping the flask contents under nitrogen atmosphere. The reaction mixture was heated to 150° C. and maintained at that temperature for three hours, when water distillate was observed collecting into the receiver flask. The reaction temperature was slowly raised to 190° C. under a slight pressure of nitrogen when about 37 g of water of reaction was collected. The reaction temperature was slowly raised to 200° C. under a slight pressure of nitrogen when about 42 g of water of reaction was collected in the receiver flask over a period of 8 hours to yield a viscous, clear to slightly tinted molten product that climbs on the stirrer shaft. The product was cooled to room temperature under nitrogen blanket to yield (98%) solid polyesteramide. The product was characterized by FTIR and NMR.

Example 12: 346.53 g L-(+)-tartaric acid, 138.98 g 1,3-propanediol, 56.05 g 1,6-hexamethylenediamine, and 72 mg 3,5-bis(trifluoromethyl)phenyl boronic acid were charged into a 1 liter 4 neck round bottom flask equipped with an overhead stirrer, nitrogen gas purge, thermocouple thermometer, and a distillation adaptor with a water-cooled condenser. The round bottom flask was heated using a heating mantle. The other end of the condenser was connected to a two-neck round bottom receiver flask that in turn is connected to a vacuum line/nitrogen vent. Prior to the start of the reaction, the contents were evacuated of air by exchanging nitrogen and vacuum and keeping the flask contents under nitrogen atmosphere. The reaction mixture was heated to 150° C. and maintained at that temperature for three hours, when water distillate was observed collecting into the receiver flask. Once no more water was observed condensing into the receiver flask, 26 mg boric acid was charged into the reactor under nitrogen blanket. The reaction temperature was slowly raised to 200° C. under a slight pressure of nitrogen when additional water of reaction was observed being collected in the receiver vessel. The reaction temperature was maintained at 200° C. for 8 hours to yield a viscous, tan molten product that climbs on the stirrer shaft. The product was cooled to room temperature under nitrogen blanket to yield (98%) solid block polyesteramide. The product was characterized by FTIR and NMR.

Example 13: 469.00 g citric acid, 74.94 g glycerol, and 20 mg boric acid were charged into a 1 liter 4 neck round bottom flask equipped with an overhead stirrer, nitrogen gas purge, thermocouple thermometer, and a distillation adaptor with a water-cooled condenser. The round bottom flask was heated using a heating mantle. The other end of the condenser was connected to a two-neck round bottom receiver flask that in turn is connected to a vacuum line/nitrogen vent. Prior to the start of the reaction, the contents were evacuated of air by exchanging nitrogen and vacuum and keeping the flask contents under nitrogen atmosphere. The reaction mixture was heated to 140° C. and maintained at that temperature for three to four hours, when a solid slush transitions to a hazy slush and then into a clear molten liquid with water of condensation distilling into the receiver. A total of 44 g of water of reaction was collected into the receiver flask. After all the collected water was drained, the reaction system was held under vacuum of <1 Torr. The reaction temperature was then raised to 170° C. slowly over a 90-minute period. When no more distillate was observed, the vacuum was broken, and the product cooled to room temperature under nitrogen blanket to yield 98% product. The product is a clear, white, water-soluble solid. The —COOH acid content was confirmed by titration with standard 0.1N NaOH solution and matched the theoretical expectation of —COOH groups per product molecule.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A polyester comprising a pendant hydroxyl, the polyester having a linear, comb, or star structure selected from the group consisting of Formula (III) and Formula (IV), and stereoisomers and enantiomers thereof:

Formula (III)

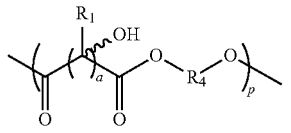

Formula (IV)

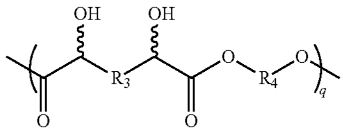

wherein:

(vi) $R_1$ is a member selected from a group independently consisting of an optionally substituted alkyl, an optionally substituted cycloalkyl, and an optionally substituted aryl, and mixtures thereof;

(vii) ‘a’ is an integer having a value of from 1 to 6;

(viii) $R_4$ represents a radical of a polyol;

(ix) $R_3$ represents a bivalent radical selected from the group consisting of:

c. $(CH_2)_y$, wherein ‘y’ is an integer between 1 and 8; and d. $R^aCH$, wherein $R^a$ is selected from the group consisting of alkyl, cycloalkyl, aryl, alkylaryl, and a heteroaryl; and (x) ‘p’ and ‘q’ each represent an integer such that a number average molecular weight of the polyester is between 200 and 500,000 Dalton (Da).

2. The polyester of claim 1, wherein the polyester is derived from an alpha-hydroxy acid and a mass of the alpha-hydroxy acid residues is at least 10 weight % of a total weight of all pendant hydroxyl groups.

3. The polyester of claim 1, wherein $R_4$ is a radical of a polyol that is a member selected from the group consisting of a diol, triol, tetraol, pentaol, hexaol, monosaccharide, disaccharide, oligosaccharide, and polymeric polyol.

4. The polyester of claim 1, wherein $R_4$ is a radical of a polyol that is a member selected from the group consisting of alkyl, heteroalkyl, cycloalkyl, heterocycloalkyl, alkenyl, heteroalkenyl, cycloalkenyl, heterocycloalkenyl, alkynyl, heteroalkynyl, cycloalkynyl, and heterocycloalkynyl.

5. The polyester of claim 1, wherein $R_4$ is a radical of a polyester polyol.

6. The polyester of claim 1, wherein $R_4$ is a radical of a polyol containing heteroatoms.

7. The polyester of claim 1, wherein $R_4$ is a radical that is a siloxane having a number average molecular weight of up to 5000 Da.

8. The polyester of claim 1, where $R_4$ is a radical of a fluorinated polyol.

9. The polyester of claim 8, wherein:

$R_4$ is a radical of $(Z(CH_2)_uOH(CH_2)_vOH)$;

Z is a linear group;

Z is a perfluoroalkane radical having from 4 to 12 carbon atoms; and

‘u’ and ‘v’ are integers between 1 and 8.

10. The polyester of claim 1, wherein the polyester is substantially water-soluble or water-dispersible.

11. The polyester of claim 1, wherein the polyester is amphiphilic and selected from the group consisting of non-ionic, anionic, cationic, mixed-charge, and zwitterionic.

12. A method of producing a polyester comprising a pendant hydroxyl having a linear, comb, or star structure selected from the group consisting of Formula (I) and Formula (II), and stereoisomers and enantiomers thereof:

Formula (I)

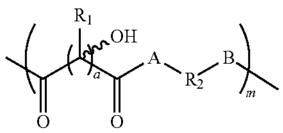

Formula (II)

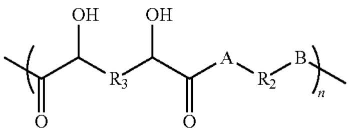

wherein:

(i) $R_1$ is a member selected from a group independently consisting of an optionally substituted alkyl, an optionally substituted cycloalkyl, and an optionally substituted aryl, and mixtures thereof;

(ii) 'a' is an integer having a value of from 1 to 6;

(iii) $R_2$ represents a radical of a polyol;

(iv) $R_3$ represents a bivalent radical selected from the group consisting of:

(d) $(CH_2)_y$, wherein 'y' is an integer between 1 and 8; and (e) $R^aCH$, wherein $R^a$ is selected from the group consisting of alkyl, cycloalkyl, aryl, alkylaryl, and an heteroaryl; and (f) 'm' and 'n' each represent an integer such that a number average molecular weight of the repeating unit is between 200 and 500,000 Dalton (Da), the method comprising:

performing a chemoselective catalytic polycondensation of an α-hydroxy acid or a mixture thereof with a polyol or a mixture of polyols; and adding a boron catalyst to the polycondensation reaction at a temperature greater than 70° C.

13. The method of claim 12, further comprising:

heating the reaction mixture above 100° C. and eliminating small molecular weight byproducts during a first step of the polycondensation reaction; and heating the reaction mixture to 280° C. under a reduced pressure of less than 1 Torr to eliminate lower molecular weight polyols and diols during a second step of the polycondensation reaction.

* * * * *